(12) United States Patent
Nagai et al.

(10) Patent No.: US 11,153,456 B2
(45) Date of Patent: Oct. 19, 2021

(54) PRINTING APPARATUS

(71) Applicant: SEIKO EPSON CORPORATION, Tokyo (JP)

(72) Inventors: Yoshikazu Nagai, Shiojiri (JP); Yoshiyuki Okazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/842,353

(22) Filed: Apr. 7, 2020

(65) Prior Publication Data
US 2020/0329171 A1      Oct. 15, 2020

(30) Foreign Application Priority Data

Apr. 10, 2019  (JP) .............................. JP2019-074636

(51) Int. Cl.
*H04N 1/10*      (2006.01)

(52) U.S. Cl.
CPC ................ *H04N 1/1013* (2013.01)

(58) Field of Classification Search
CPC .. H04N 1/1013; H04N 1/2307; H04N 1/2323; H04N 1/387; B41J 2/175; B41J 2/17509; B41J 2002/16564; B41J 2002/1742; B41J 2202/12; B41J 2202/20; B41J 25/304; B41J 2/1433; B41J 2/155; B41J 2/1721; B41J 2/17513; B41J 2/17523; B41J 2/17593; B41J 11/007; B41J 11/06; B41J 11/42; B41J 13/0018; B41J 25/34; B41J 29/13; B41J 29/38; B41J 2/15; B41J 2/16508; B41J 2/16511; B41J 2/16517; B41J 2/16526; B41J 2/17506; B41J 2/1752; B41J 2/17566; G06T 3/60; G11B 17/056

USPC ............................................. 358/474
See application file for complete search history.

(56) References Cited

U.S. PATENT DOCUMENTS

| 4,513,324 A * | 4/1985 | Poetsch ............... H04N 7/0112 348/97 |
| 5,072,304 A * | 12/1991 | Abe ..................... H04N 1/2307 358/296 |
| 7,663,790 B2 * | 2/2010 | Shiraishi .................. B41J 2/473 359/204.1 |
| 2004/0118676 A1 * | 6/2004 | Mizohata ............ H01L 21/2885 204/193 |
| 2005/0286929 A1 * | 12/2005 | Park ..................... G03G 15/605 399/124 |
| 2006/0249178 A1 * | 11/2006 | Manness ................ B41N 3/006 134/10 |
| 2008/0266608 A1 * | 10/2008 | Yamazaki ............ H04N 1/4051 358/3.06 |
| 2008/0297571 A1 * | 12/2008 | Umeda ................ B41J 2/17513 347/85 |
| 2009/0295080 A1 * | 12/2009 | Sakai ...................... B41J 13/10 271/264 |

(Continued)

FOREIGN PATENT DOCUMENTS

JP       2008-296508        12/2008

*Primary Examiner* — Negussie Worku
(74) *Attorney, Agent, or Firm* — Workman Nydegger

(57) ABSTRACT

A printer has: a recording unit having a recorder that makes a record on a medium; and a scanner unit having a reader that reads an original placed on an original table, the scanner unit being disposed on the top of the recording unit. The scanner unit is horizontally shift between a first position at which the recording unit is used and a second position, which is a maintenance position of the recording unit.

9 Claims, 10 Drawing Sheets

(56) References Cited

U.S. PATENT DOCUMENTS

| | | | | |
|---|---|---|---|---|
| 2011/0157666 A1* | 6/2011 | Hirokawa | ............ | H04N 1/1235 |
| | | | | 358/498 |
| 2016/0039204 A1* | 2/2016 | Matsui | ................ | B41J 2/17593 |
| | | | | 347/44 |
| 2018/0207859 A1* | 7/2018 | Ochi | .................... | B29C 64/393 |
| 2018/0281417 A1* | 10/2018 | Hasegawa | ............ | B41J 2/16508 |
| 2020/0016901 A1* | 1/2020 | Chino | .................... | B41J 11/007 |
| 2020/0207103 A1* | 7/2020 | Tamaru | .................... | B41J 2/195 |
| 2020/0307263 A1* | 10/2020 | Taketsugu | ................ | B41J 11/06 |

* cited by examiner

PRINTING APPARATUS

The present application is based on, and claims priority from JP Application Serial Number 2019-074636, filed Apr. 10, 2019, the disclosure of which is hereby incorporated by reference herein in its entirety.

BACKGROUND

1. Technical Field

The present disclosure relates to a printing apparatus that discharges liquid toward a medium to make a recording.

2. Related Art

A printer used as an example of a recording apparatus has a recorder that discharges ink as a liquid toward a medium to make a record and also has a liquid storage section that stores ink to be supplied to the recorder. The printer is structured so that the liquid storage section is disposed in a recording unit in which the recorder is disposed and that when ink is consumed due to printing can, the ink can be replenished. A printer having this structure is disclosed in JP-A-2008-296508.

The printer described in JP-A-2008-296508, which has a scanner unit above the top of a recording unit, is structured as a multi-function peripheral that has both a recording function to make a record on a medium and a read function to read an original. The scanner unit is structured so that when it is swung with respect to the recording unit, the upper portion of the main body of the printer can be made open or closed. In a state in which the interior of the recording unit is made open by opening the scanner unit, ink can be replenished to the liquid storage section.

When the scanner unit has an orientation maintainer that maintains its open state, for example, the scanner unit's orientation in which the scanner unit is open can be maintained when ink is to be replenished to the liquid storage section. However, there has been the risk that the maintained orientation state created by the orientation maintainer is unintentionally disabled and the scanner unit is thereby closed by its own weight.

SUMMARY

To solve the above problem, a recording apparatus according to the present disclosure has: a recording unit having a recorder that makes a record on a medium; and a scanner unit having a reader that reads an original placed on an original table, the scanner unit being disposed on the top of the recording unit. The scanner unit is horizontally shift between a first position at which the recording unit is used and a second position, which is a maintenance position of the recording unit.

DESCRIPTION OF EXEMPLARY EMBODIMENTS

Figure 1:
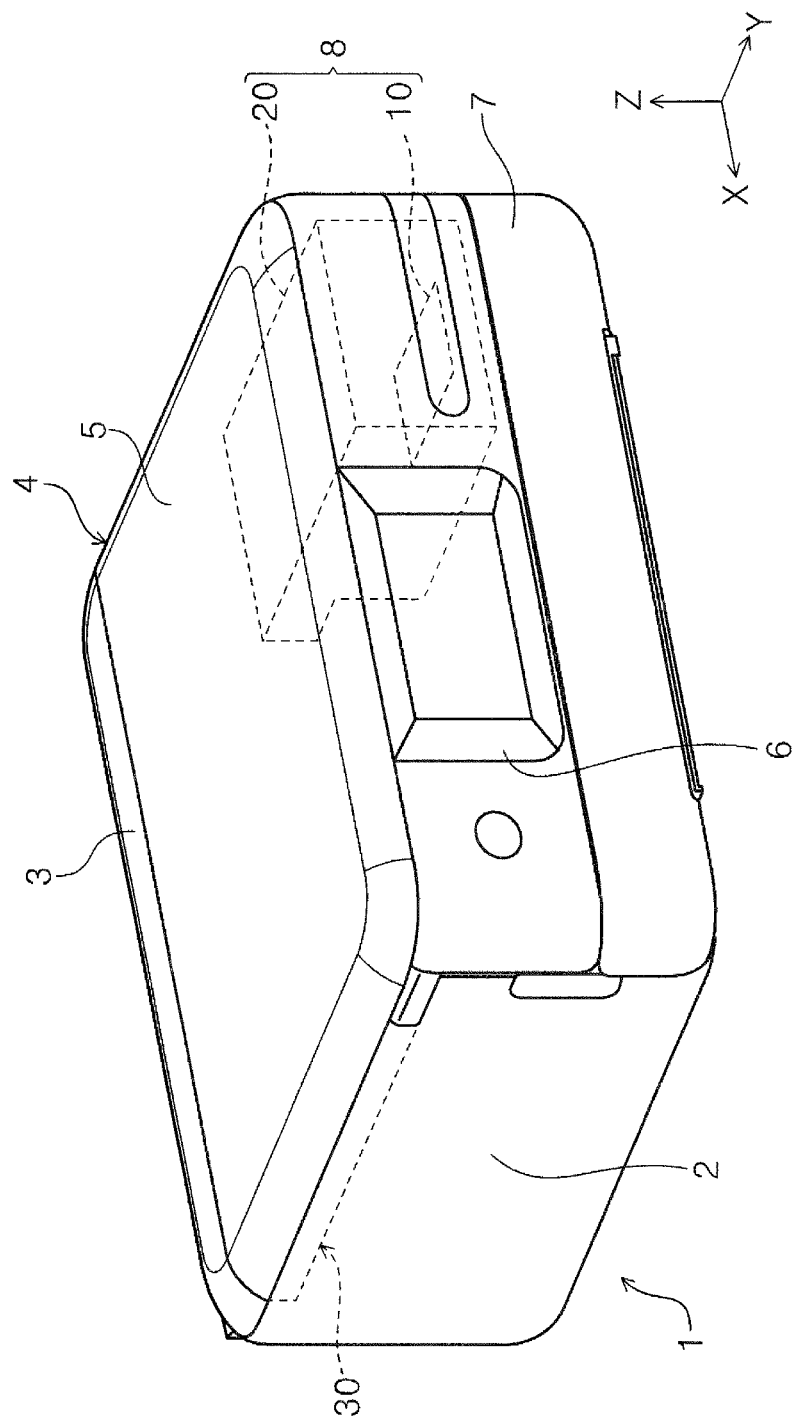
FIG. 1 is a perspective view illustrating a printer according to a first embodiment.

The present disclosure will be generally described below.

A recording apparatus according to a first aspect has: a recording unit having a recorder that makes a record on a medium; and a scanner unit having a reader that reads an original placed on an original table, the scanner unit being disposed on the top of the recording unit. The scanner unit is horizontally shift between a first position at which the recording unit is used and a second position, which is a maintenance position of the recording unit.

According to this aspect, the scanner unit is horizontally shift between a first position at which the recording unit is used and a second position, which is a maintenance position of the recording unit. Therefore, it is possible to reduce the risk that the scanner unit is closed by its own weight unlike a scanner unit structured so that when it is swung, the upper portion of a recording unit is made open or closed.

In a second aspect, a guide rail extending horizontally is provided in the first aspect, the scanner unit being shifted along the guide rail.

According to this aspect, a guide rail extending horizontally is provided in the first aspect, the scanner unit being shifted along the guide rail. Therefore, an effect similar to the effect in the first aspect can be obtained with a simple structure.

In a third aspect, an arm having two ends is provided in the first aspect. One of the two ends is a first end that is swingably attached to the recording unit. The other of the two ends is a second end that is swingably attached to the scanner unit. When the arm is swung, the scanner unit is horizontally moved and is shifted upward.

According to this aspect, a displacement mechanism is provided that has an arm, a first end of which is swingably attached to the recording unit and a second end of which is swingably attached to the scanner unit, the second end being opposite to the first end. When the arm is swung, the scanner unit is moved in its depth direction or width direction and is moved upward. Therefore, an effect similar to the effect in the first aspect can be obtained by the displacement mechanism.

In a fourth aspect, a position holder is provided in any one of the first to third aspects. The position holder can make a switchover between a shiftable state in which the scanner unit is shiftable between the first position and the second position and a hold state in which the scanner unit is held at least at the second position.

According to this aspect, since the position holder is provided, it is possible to prevent the scanner unit from being shifted from the second position to the first position with an unintentional external force.

In a fifth aspect, the position holder has a resistor in the fourth aspect. The resistor produces a resistance during a switchover from the hold state to the shiftable state.

According to this aspect, a switchover can be made from the hold state to the shiftable state against a resistance produced by the resistor. Therefore, the hold state is not easily switched.

In a sixth aspect, in any one of the first to fifth aspects, the recorder makes a record by discharging a liquid to a medium, the recording unit has a liquid storage section that stores the liquid to be supplied to the recorder, the liquid storage section having a pour through which the liquid can be supplied, and at the second position, the scanner unit is structured so as not to interfere with a liquid replenishment container attached to the pour.

According to this aspect, when the scanner unit is moved to the second position, the replenishment container can be attached to the pour and the liquid can then be replenished to the liquid storage section.

In a seventh aspect, in the sixth aspect, the recording apparatus has a detection section that can detect the shift of the scanner unit from the first position to the second position, a manipulation section that accepts a manipulation input, and a control section that controls the operation of the recording apparatus according to a manipulation input made on the manipulation panel and to a detection result from the detection section. When the control section decides, according to detection information from the detection section, that the scanner unit has shifted from the first position to the second position, the control section places the manipulation panel in an input inhibited state in which an input of a manipulation for the scanner unit is not accepted.

According to this aspect, when the scanner unit is at other than the first position, it is possible to place the manipulation section in the input inhibited state.

In an eight aspect, in the seventh aspect, the manipulation section has a display section on which information is displayed, and when the control section decides, according to detection information from the detection section, that the scanner unit has shifted from the first position to the second position and the amount of liquid remaining in the liquid storage section is at least at a level at which the liquid storage section needs to be replenished with the liquid, the control section displays, on the display section, a message prompting the replenishment of the liquid to the liquid storage section.

According to this aspect, when the user has shifted the scanner unit to the second position, the user can be prompted to replenish the liquid to the liquid storage section according to the amount of liquid remaining in the liquid storage section.

In a ninth aspect, in any one of the sixth to eighth aspects, the recorder has a carriage that supports the recording unit that discharges the liquid, the liquid storage section being mountable in the carriage.

According to this aspect, in the recording apparatus in which the recorder has a carriage that supports the recording unit that discharges the liquid, the liquid storage section being mountable in the carriage, an effect to similar to the effect in any one of the sixth to eighth aspects is obtained.

In a tenth aspect, in the ninth aspect, the second position is closer to the back of the recording apparatus than is the first position, the carriage moves in a width direction crossing the depth direction of the recording apparatus, a linear scale extending in the width direction is provided, the linear scale being used to detect the position of the carriage, and at the second position, the scanner unit covers the top of the linear scale.

According to this aspect, it is possible to reduce the risk that the liquid splashes and adheres to the linear scale during the replenishment of the liquid to the liquid storage section.

First Embodiment

A recording apparatus in an embodiment of the present disclosure will be generally described below with reference to the drawings. In this embodiment, an ink jet printer 1 will be taken as an example of the recording apparatus. The ink jet printer 1 will be simply referred to below as the printer 1.

In the XYZ coordinate system in the drawings, the X-axis direction indicates the width direction of the printer 1, the Y-axis direction indicates the depth direction of the printer 1, and the Z-axis direction indicates the height direction of the printer 1. The +Y direction is the direction toward the front of the printer 1, and the −Y direction is the direction toward the back of the printer 1. When the printer 1 is viewed from its front side, the direction toward the left side is the +X direction, and the direction toward the right side is the −X direction. The +Z direction is the upward direction, and the −Z direction is the downward direction.

In the printer 1, a direction in which a medium is transported will be referred to the downward direction and the direction opposite to the downward direction will be referred to as the upward direction.

Outline of the Printer

The printer 1 illustrated in FIG. 1 has a recording unit 2 having a recorder 8 that makes a record on a medium, and also has a scanner unit 4, disposed on the top of the recording unit 2, that reads an image in an original. That is, the printer 1 is structured as a multi-function peripheral that has not only a recording function but also an image read function.

Examples of media on which a record is made by the printer 1 include plain paper, thick paper, such as postcards and business cards, thicker than plain paper, thin paper thinner than plain paper, and glossy paper used for photography. The printer 1 is structured so that recording is also possible on the label surface of a disk-type storing medium.

In the printer 1, the recorder 8 has a recording unit 10 that discharges ink and also has a carriage 20 that supports the recording unit 10. The recorder 8 is structured so that ink is discharged from the recording unit 10 toward a medium P to make a record. That is, the recorder 8 makes a record by discharging ink (liquid) toward a medium P.

As illustrated in FIG. 1, the printer 1 has a manipulation panel 6 on its front in the +Y direction, as a manipulation section that accepts a manipulation input. The manipulation panel 6 not only can accept manipulations for various settings and execution, but also doubles as a display section that displays, as information, the accepted manipulations, a preview of an image read by the scanner unit 4, and the like.

Figure 4:
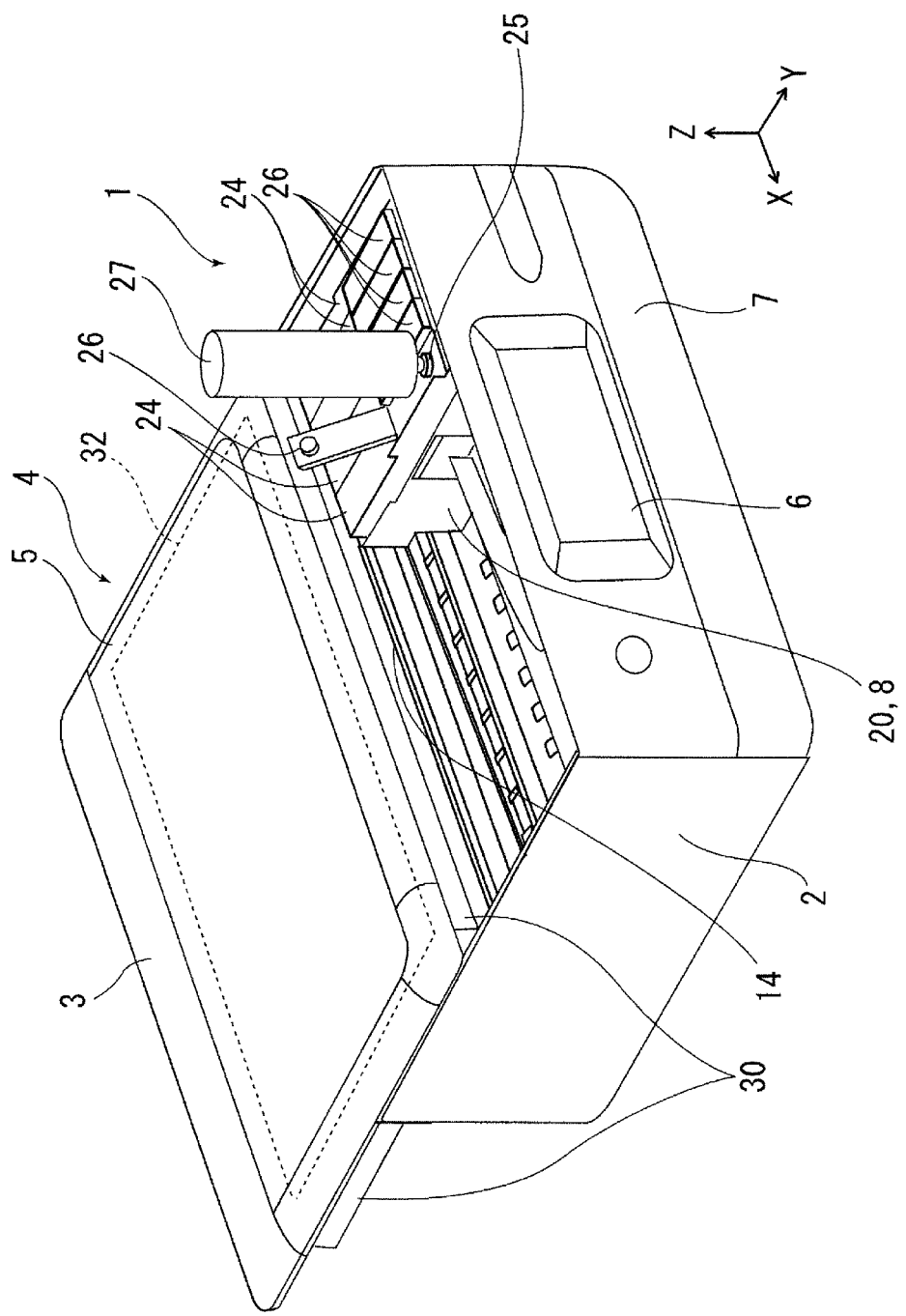
FIG. 4 is a perspective view illustrating a state in which the scanner unit has been moved to a second position in the printer according to the first embodiment.

The scanner unit 4 is structured so that it can make the upper portion of the recording unit 2 open or closed. In FIG. 1, a closed state is illustrated in which the scanner unit 4 makes the recording unit 2 closed. In FIG. 4, a state is illustrated in which the scanner unit 4 is moved to make part of the upper portion of the recording unit 2 open. In FIG. 1, the scanner unit 4 is at a position at which the recording unit 2 makes a record, that is, the recording unit 2 is used. The position of the scanner unit 4 illustrated in FIG. 1 will be referred to below as a first position of the scanner unit 4. In FIG. 4, the scanner unit 4 is at a maintenance position, for maintenance of the recording unit 2, at which part of the upper portion of the recording unit 2 is open so as to expose the interior of the recording unit 2. The position of the scanner unit 4 illustrated in FIG. 4 will be referred to below as a second position of the scanner unit 4.

A structure by which the scanner unit 4 is moved between the first position and the second position will be described later in detail.

In FIG. 1, a lower cover 7 is provided at the bottom of the front of the recording unit 2.

Figure 3:
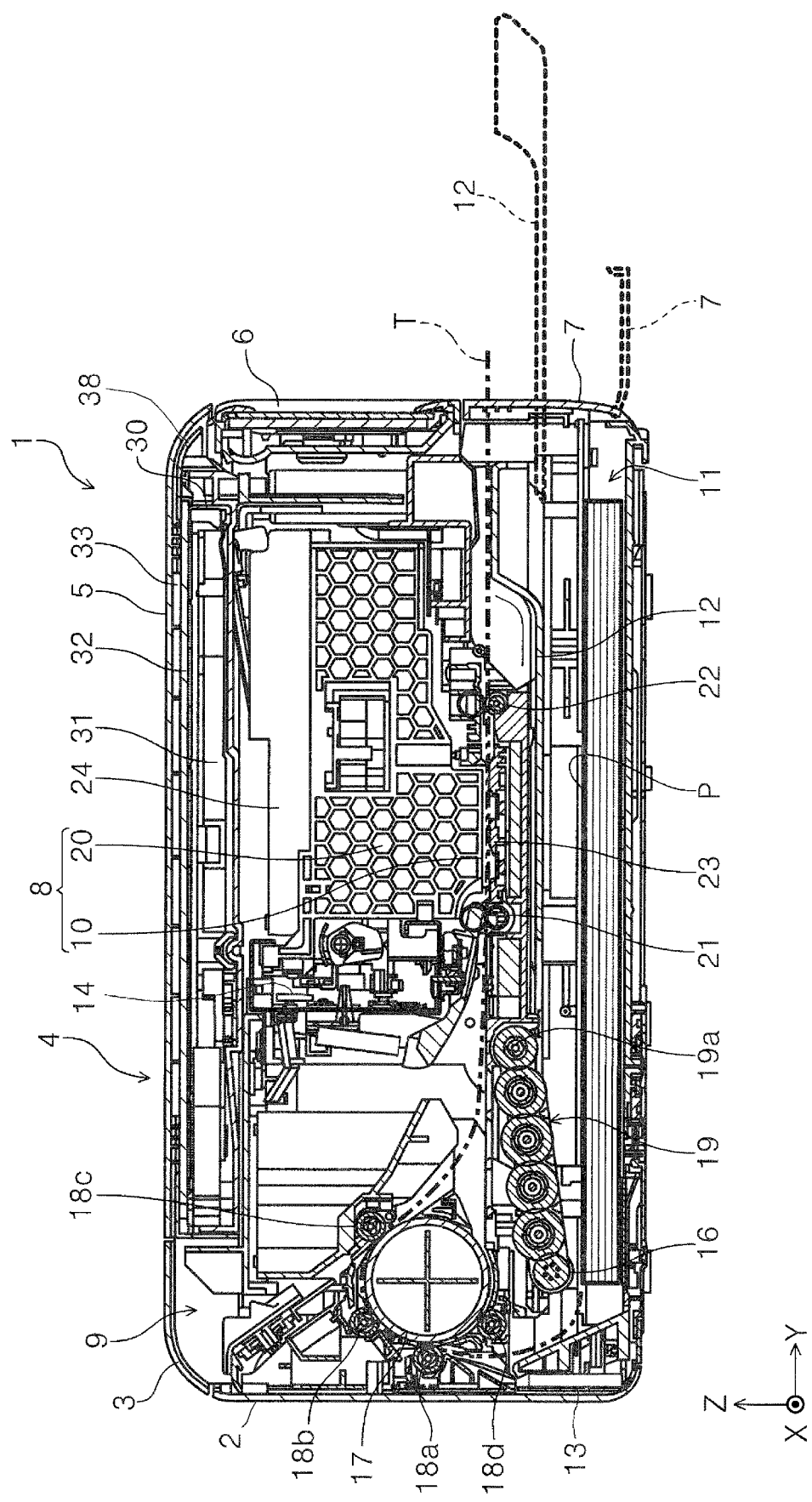
FIG. 3 is a side sectional view of the printer according to the first embodiment.

When the lower cover 7 is opened as indicated by dotted lines in FIG. 3, a medium tray 11 in which a medium P before printing is placed and an ejection tray 12 that accepts a medium P ejected after printing are exposed.

The ejection tray 12 is structured so as to be switchable between a storage state in which the ejection tray 12 is stored in the recording unit 2 as indicated by solid lines in FIG. 3 and a protrusion state in which the ejection tray 12 protrudes beyond the front of the recording unit 2 as indicated by dotted lines in FIG. 3. In the protrusion state, a medium P after recording can be accepted. The ejection tray 12 can be structured so as to be switchable between the storage state and the protrusion state by a motor (not illustrated).

A plurality of media P can be placed in the medium tray 11. The medium tray 11 can be attached to and detached from the recording unit 2. The medium tray 11 can feed a medium P to a medium transport path T, which will be described later, with the medium tray 11 attached to the recording unit 2 as illustrated in FIG. 3. Although not illustrated, the medium tray 11 can be replenished with media P in a state in which the medium tray 11 is drawn forward (in the +Y direction).

Medium Transport Path in the Printer

Next, the medium transport path T in the printer 1 will be described with reference to FIG. 3.

The medium transport path T is a transport path through which a medium P is transported from the medium tray 11 disposed at the bottom of the printer 1 toward a recording area used by the recorder 8.

The medium P placed in the medium tray 11 is picked up by a supply roller 16 and is fed to the medium transport path T. Specifically, the supply roller 16, its rotation being driven by a motor (not illustrated), is attached to a roller support member 19 that swings around a swing shaft 19a. When the supply roller 16 abuts the topmost of a plurality of media P placed in the medium tray 11 and is then rotated, the supply roller 16 feeds the topmost medium P from the medium tray 11 toward the back of the printer 1 (in the −Y direction).

An intermediate roller 17, its rotation being driven by a motor (not illustrated), is provided downstream of the supply roller 16. The medium P is curved and is inverted by the intermediate roller 17, after which the medium P is fed toward the front of the printer 1 (in the +Y direction). Driven rollers 18a, 18b, 18c, and 18d can be rotated by being driven by the intermediate roller 17. The medium P is nipped by the driven roller 18a and intermediate roller 17, nipped by the driven rollers 18b and intermediate roller 17, and further nipped by the driven rollers 18c and intermediate roller 17. The medium P is then fed toward the downstream. The driven rollers 18d will be described later.

A transport roller pair 21 is provided downstream of the intermediate roller 17. The medium P is fed toward the downstream of the recording unit 10 by the transport roller pair 21. The transport roller pair 21 is composed of an upper roller and a lower roller, which are respectively disposed on the upper side and lower side in FIG. 3. The rotation of the lower roller of the transport roller pair 21 is driven by a motor (not illustrated), and the rotation of the upper roller is driven by the lower roller.

The recorder 8 is disposed downstream of the transport roller pair 21. In the recorder 8, the recording unit 10, which discharges ink, is disposed at the bottom of the carriage 20. A liquid storage section 24, which stores ink to be supplied to the recording unit 10, can be mounted in the carriage 20. That is, the liquid storage section 24 is disposed in the recording unit 2.

The carriage 20 is structured so as to be bidirectionally movable by a motor (not illustrated) in the width direction (X-axis direction) crossing the depth direction (Y-axis direction) of the printer 1. A linear scale 14 used to detect the position of the carriage 20 is provided in the −Y direction, which is a direction toward the back of the carriage 20 in FIG. 3. The linear scale 14 extends in the width direction, in which the carriage 20 moves, as illustrated in FIG. 4.

A medium support member 23 that supports a medium P to be transported through the medium transport path T is provided at a position at which the medium support member 23 faces the recording unit 10. A spacing between the medium P and the recording unit 10 is defined by the medium support member 23. The spacing between the medium P and the recording unit 10 is also referred to as the gap.

An ejection roller pair 22 is provided downstream of the medium support member 23. As with the transport roller pair 21, the rotation of the lower roller of the ejection roller pair 22 is driven by a driving source (not illustrated), and the rotation of the upper roller is driven by the lower roller. The medium P on which a record has been made by the recorder 8 is ejected by the ejection roller pair 22 toward the ejection tray 12 protruded as indicated by dotted line in FIG. 3.

The printer 1 is structured so that it can perform double-sided printing, in which a record is made on both a first surface of a medium P and a second surface, which is opposite to the first surface. In double-sided printing, printing is first performed on the first surface, after which the medium P is switched back and is fed in the −Y direction. The medium P that has been switched back is nipped by the driven rollers 18d and intermediate roller 17, after which the medium P can join the medium transport path T. The medium P is inverted by the intermediate roller 17 and is transported below the recording unit 10 in a state in which the second surface faces the recording unit 10. Then, a record is made on the second surface.

In the structure of the printer 1, a medium P on which a record is to be made can also be supplied from an upper supply opening 9 formed at the upper portion of the back of the printer 1. The upper supply opening 9 is made open when a supply opening cover 3 is opened. The medium P that has been supplied from the upper supply opening 9 enters the medium transport path T from the upstream of the transport roller pair 21, after which a record is made by the recording unit 10. Various operations, including the operation of the scanner unit 4, by the printer 1 are controlled by a control section 13 (see FIG. 3). The control section 13 controls the printer 1 according to a manipulation input made on the manipulation panel 6 (see FIG. 1).

Liquid Storage Section

In the printer 1, when ink in the liquid storage section 24 mounted in the carriage 20 as illustrated in FIG. 4 is reduced due to the execution of printing, the liquid storage section 24 can be replenished with the ink.

A plurality of liquid storage sections 24 are mounted in the carriage 20 in correspondence to a plurality of colors. At the top of each liquid storage section 24, a pour 25 is formed through which ink is supplied to the liquid storage section 24. A cap 26 that closes the pour 25 is provided on the top of the liquid storage section 24. FIG. 4 illustrates a state in which the cap 26 of the leftmost liquid storage section 24 is open when the drawing is viewed from the front and the pour 25 is thereby exposed. When the cap 26 is swung around its portion close to the back of the printer 1 (in the −Y direction), the cap 26 makes the pour 25 open or closed. As an example, when a replenishment container 27 including replenished ink is inserted into the pour 25, the ink can be supplied from the replenishment container 27 to the liquid storage section 24. In FIG. 4, the carriage 20 is at a home position at one end of a movable area in which the carriage 20 moves. In this embodiment, the home position is set at the end of the movable area in the −X direction.

Outline of the Scanner Unit

Figure 2:
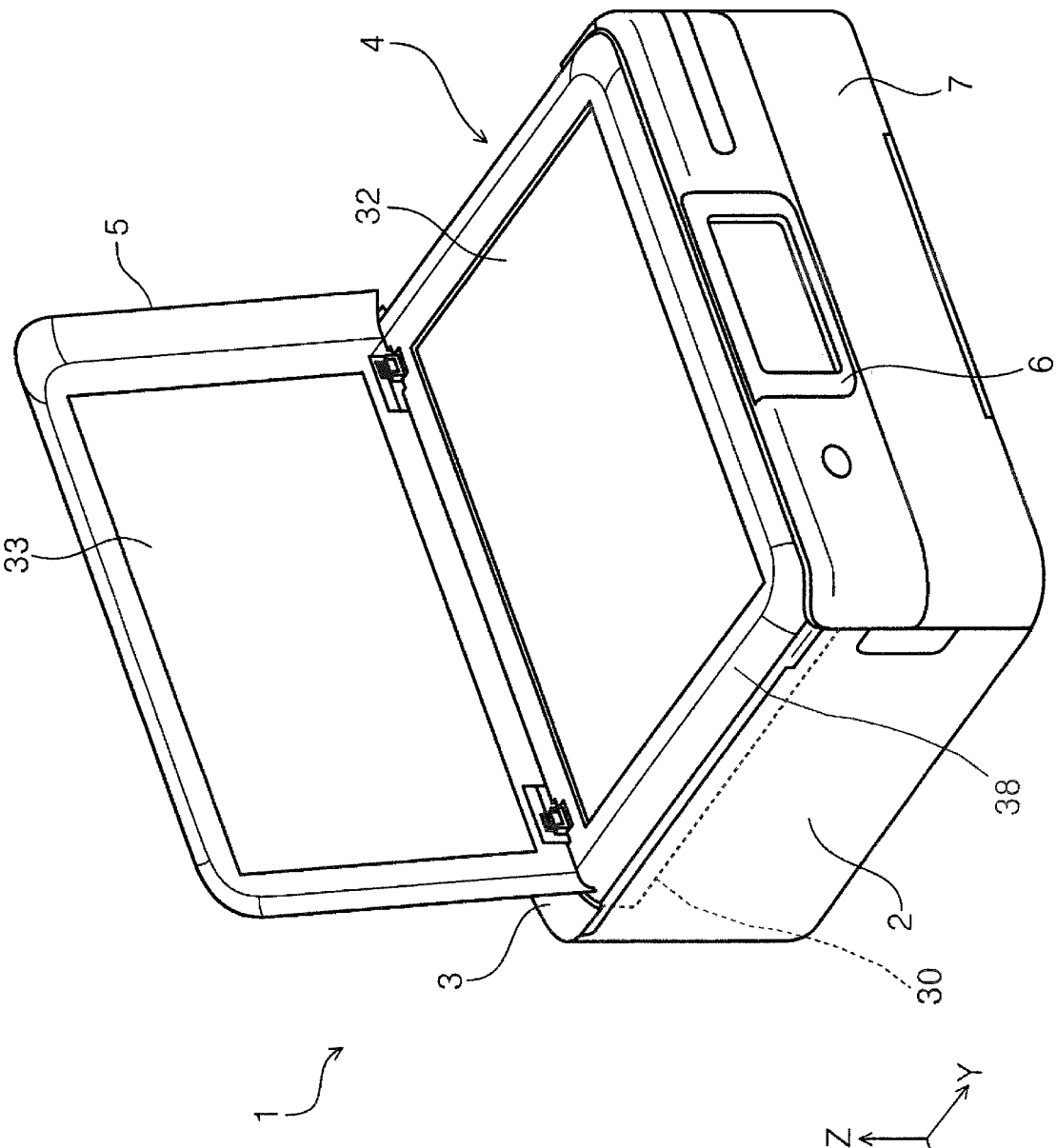
FIG. 2 is a perspective view illustrating a state in which the original table cover of a scanner unit is open in the printer according to the first embodiment.

The scanner unit 4 has an original table 32 on which an original is placed, and a reader 31 that reads the original placed on the original table 32 as illustrated in FIG. 3. The reader 31 is disposed in a housing 30. The scanner unit 4 has an original table cover 5 that can make the original table 32 open or closed. The original table 32 is placed on the housing 30 as illustrated in FIGS. 2 and 3. The outer circumference of the four edges of the original table 32 is pressed by a frame member 38. When the original table cover 5 is opened as illustrated in FIG. 2, the original table 32 is exposed. An original is placed on the original table 32 so that the read surface of the original faces the original table 32.

The original table cover 5 has a press plate 33 on a surface that faces the original table 32 when the original table cover 5 is closed, as illustrated in FIG. 2.

The scanner unit 4 is structured so as to shift between the first position (see FIGS. 1 and 3) at which the recording unit 2 is used and the second position (see FIGS. 4 and 5) deviating horizontally from the first position, the recording unit 2 undergoing maintenance at the second position.

In other words, with the orientation of the original table 32 maintained, the scanner unit 4 shifts between the first position and the second position deviating from the first position in the depth direction (Y-axis direction).

In this embodiment, at the first position, the scanner unit 4 covers the top of the recording unit 2 as illustrated in FIG. 1, and at the second position, the scanner unit 4 exposes the pour 25 as illustrated in FIG. 4. When the scanner unit 4 is at the second position, the liquid storage section 24 described above can be replenished with ink as an example of the maintenance of the recording unit 2. In addition to the replenishment of ink to the liquid storage section 24, other maintenance such as removal of a medium P jammed in the recording unit 2 during recording can be performed.

Figure 6:
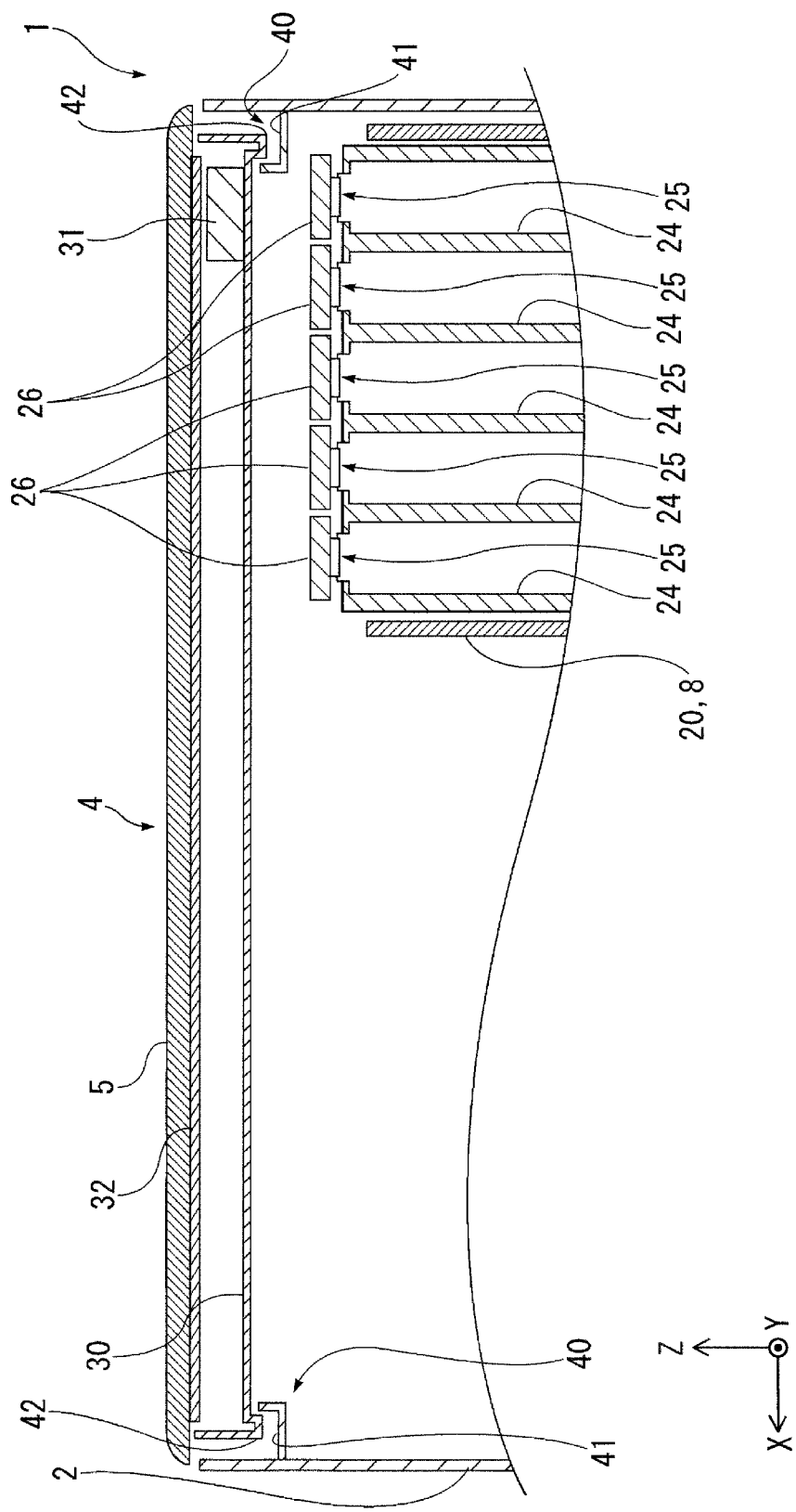
FIG. 6 is a schematic sectional view of the front of the printer according to the first embodiment.

The printer 1 has guide rails 41 illustrated in FIG. 6 as a shift mechanism 40 that shifts the scanner unit 4 between the first position and the second position. The guide rails 41 are provided at both ends of the recording unit 2 in the width direction (X-axis direction), one at each end, so as to horizontally extend along the depth direction (Y-axis direction). Guided portions 42 guided by the guide rails 41 are provided at the bottom of the housing 30 of the scanner unit 4, one for each guide rail 41. When the scanner unit 4 is slid the in Y-axis direction along the guide rails 41, the scanner unit 4 can be shifted in a state in which the orientation of the original table 32 is maintained. In this embodiment, the supply opening cover 3 positioned behind the scanner unit 4 is also shifted together with the scanner unit 4.

Since the scanner unit 4 is horizontally moved from the first position to the second position, even when the scanner unit 4 is not held with a hand with the scanner unit 4 at the second position due to, for example, the replenishment of ink to the liquid storage section 24, the risk that the scanner unit 4 moves from the second position to the first position only by its own weight can be lowered. Therefore, it is possible to reduce the risk that the scanner unit 4 unintentionally returns from the second position to the first position during maintenance performed with the scanner unit at the second position.

Due to the shift mechanism 40 implemented by the guide rails 41 horizontally extending, the scanner unit 4 can be horizontally moved with a simple structure.

Although the second position of the scanner unit 4 can also be used as a position at which the top of the recording unit 2 is completely open, it is preferable for only part of the top of the recording unit 2 to be open at the second position. In this embodiment, the second position of the scanner unit 4 is set to a position at which the scanner unit 4 does not interfere with the caps 26 when they are open. Therefore, when ink is to be replenished to the liquid storage section 24, the top of the recording unit 2 can be made open while an amount by which the scanner unit 4 protrudes backward is minimized.

In a structure in which the swing axis of the cap 26 that makes the pour 25 open or closed is not at a position close to the back of the printer 1 (in the −Y direction) but is at a position close to a side of the printer 1 or its front, or the cap 26 is removed from the liquid storage section 24 to make the pour 25 open, the second position of the scanner unit 4 can be set to a position at which the scanner unit 4 does not interferer with the replenishment container 27 attached to the pour 25. That is, the second position of the scanner unit 4 can be set to a position closer to the front of the printer 1 than is the position indicated in FIG. 5. Therefore, just by shifting the scanner unit 4 backward from the first position, the replenishment container 27 can be inserted into the pour 25 to replenish ink to the liquid storage section 24.

Figure 5:
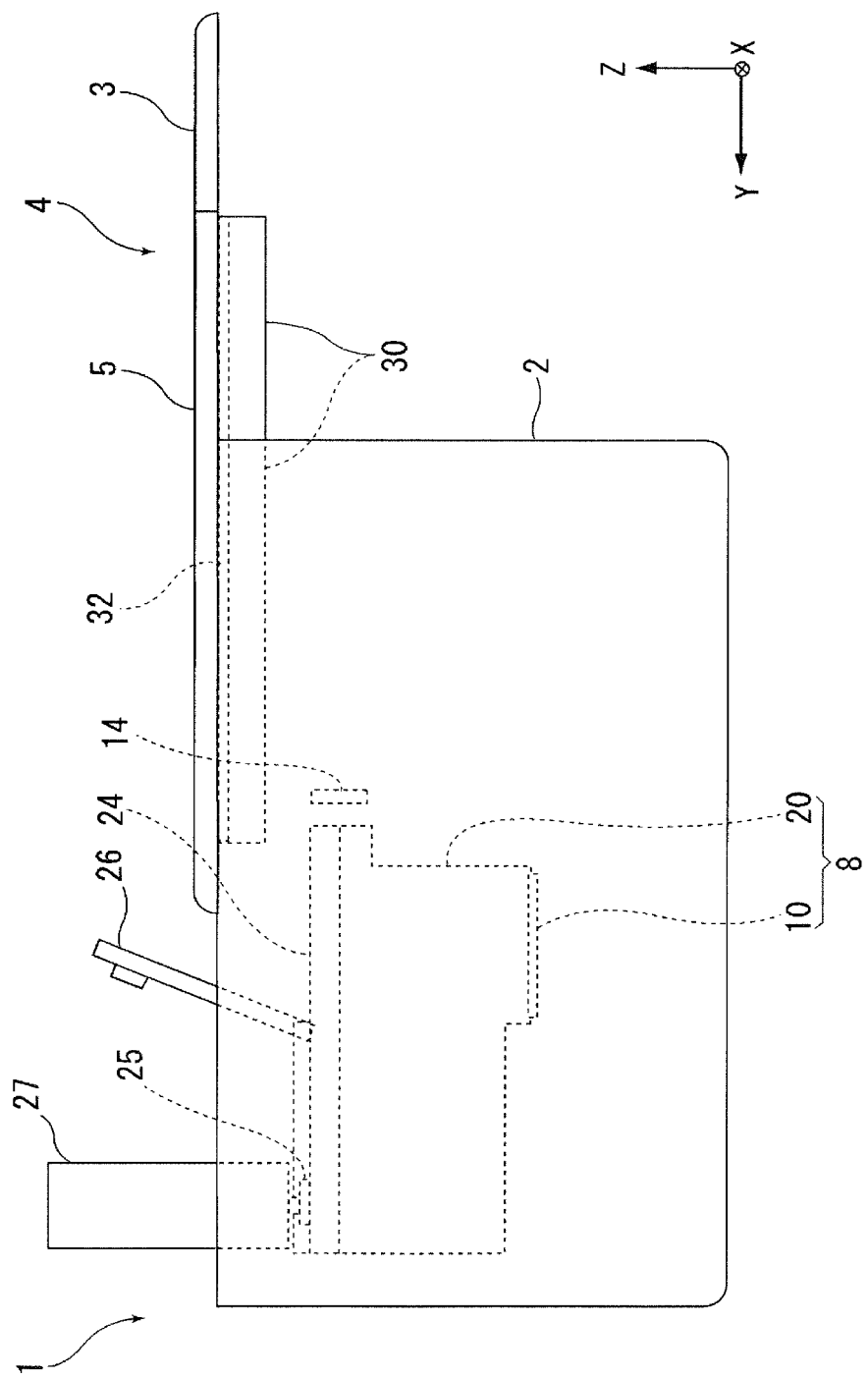
FIG. 5 is a schematic side view of the printer in FIG. 4.

In this embodiment, the scanner unit 4 is structured so as to cover the top of the linear scale 14 at the second position indicated in FIGS. 4 and 5. Since the scanner unit 4 positioned at the second position covers the top of the linear scale 14, it is possible to reduce the risk that ink splashes and adheres to the linear scale 14 during the replenishment of ink to the liquid storage section 24.

In this embodiment, the printer 1 has a position holder 50 (see FIG. 7) that can make a switchover between a shiftable state in which the scanner unit 4 can shift between the first position (see FIG. 1) and the second position (see FIG. 4) and a hold state in which the scanner unit 4 is held at least at the second position. In this embodiment, the position holder 50 is structured so that it can place the scanner unit 4 in the hold state at both the first position and the second position.

The position holder 50 has a restriction section 51 as well as a first concave portion 52 and a second concave portion 53, which are formed at the bottom of the housing 30. The first concave portion 52 is formed behind the second concave portion 53 in the depth direction (Y-axis direction). The restriction section 51 is structured so as to swingable around the shaft 51a.

Figure 7:
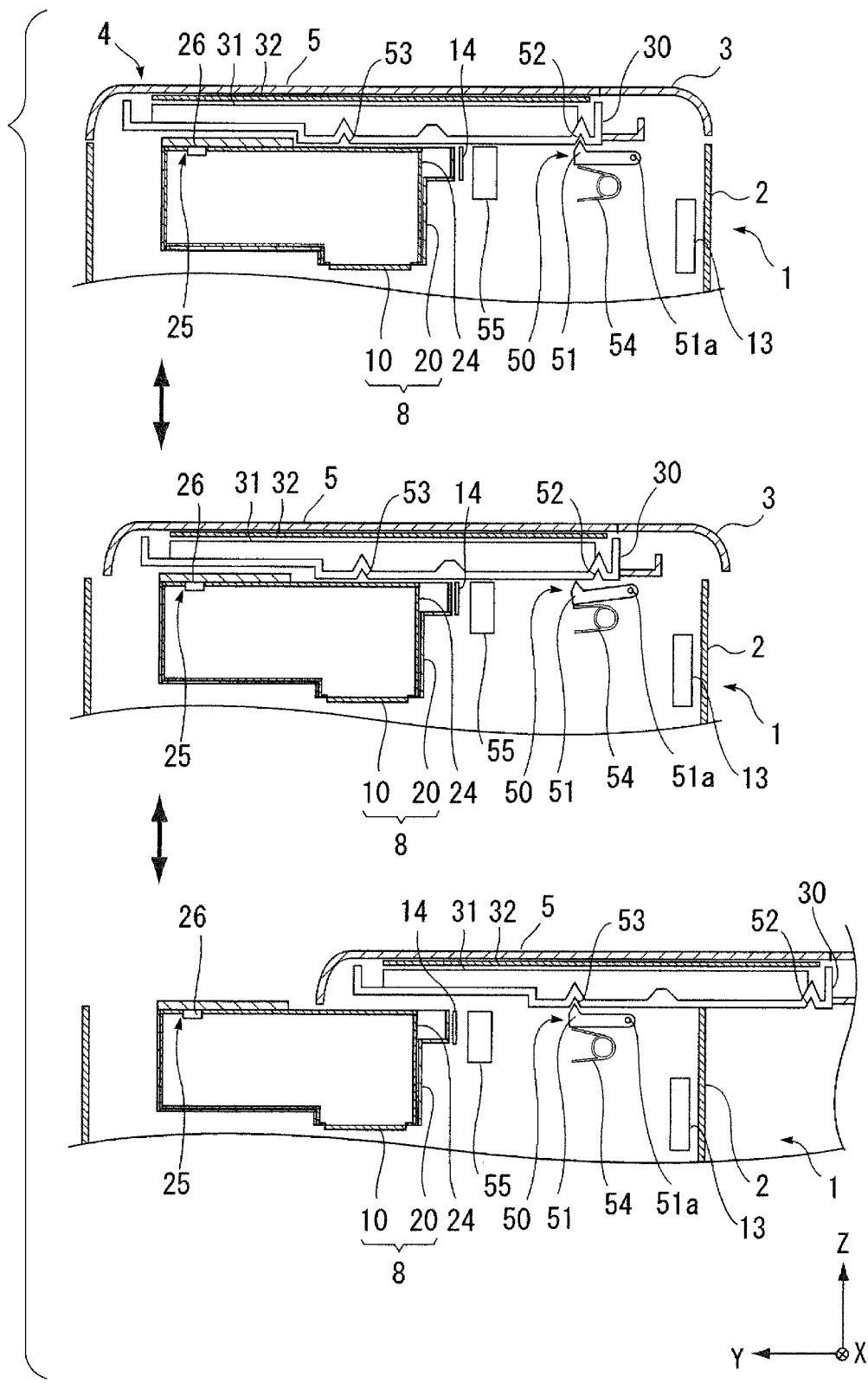
FIG. 7 illustrates a position holder of the scanner unit.

The topmost drawing in FIG. 7 illustrates a state in which the scanner unit 4 is at the first position. In this state, the restriction section 51 fits into the first concave portion 52, restricting the shift of the scanner unit 4 and holding the scanner unit 4 at the first position. The bottommost drawing in FIG. 7 illustrates a state in which the scanner unit 4 is at the second position. In this state, the restriction section 51 fits into the second concave portion 53, restricting the shift of the scanner unit 4 and holding the scanner unit 4 at the second position. The state in which the position of the scanner unit 4 is held is referred to as the hold state.

In a state in which the restriction section 51 comes off the first concave portion 52 or second concave portion 53 and is positioned between the first concave portion 52 and the second concave portion 53 as illustrated in the intermediate drawing in FIG. 7, the scanner unit 4 can shift in the depth direction. This state is referred to as the shiftable state.

When the position holder 50 of this type is provided, it is possible to avoid the shift of the scanner unit 4 from the second position to the first position due to an unintended external force.

The position holder 50 also has a pressing member 54 as a resistor that gives a resistance when the hold state is switched from the hold state to the shiftable state. In this embodiment, a helical torsion spring is used as an example of the pressing member 54. The pressing member 54 presses the restriction section 51 in a direction in which the restriction section 51 is pressed against the first concave portion 52 or second concave portion 53, that is, in an upward direction in FIG. 7. Therefore, when the housing 30 of the scanner unit 4 presses down the restriction section 51 against the pressing force of the pressing member 54, the hold state illustrated in the topmost drawing in FIG. 7 is switched to the shiftable state illustrated in the intermediate drawing in FIG. 7 or the hold state illustrated in the bottommost drawing in FIG. 7 is switched to the shiftable state illustrated in the intermediate drawing in FIG. 7. When the pressing member 54 is provided, it is possible to assure that the hold state at the first position or second position is not easily switched.

Besides the use of a spring as described in this embodiment as the resistor, the restriction section 51 can be formed from, for example, an elastically deformable material so that the restriction section 51 has a function as the resistor.

The position holder 50 is not limited to a structure having the restriction section 51, first concave portion 52, and second concave portion 53. The position holder 50 can be structured so as to have, for example, a lock pin that is inserted into and pulled out of a hole formed in the scanner unit 4, a solenoid that inserts and pulls out the pin, and a control section that controls the solenoid. When, for example, the scanner unit 4 is at the second position, the control section fits the lock pin into the hole in the scanner unit 4 to lock the scanner unit 4 at the second position and place the scanner unit 4 in the hold state. When, for example, a manipulation is made on the manipulation panel 6 to complete the replenishment of ink, the control section pulls out the lock pin from the hole to release the locking and place the scanner unit 4 in the shiftable state.

The position holder 50 can also be structured so that the pressing member 54 is eliminated and a motor that swings the restriction section 51 and a control section that controls the motor are used instead to swing the restriction section 51 so that the restriction section 51 is selectively fitted into or is pulled out from the first concave portion 52 or second concave portion 53.

Other Structures of the Printer

The printer 1 can have a detection section 55 that can detect a shift of the scanner unit 4 from the first position to the second position as illustrated in FIG. 7. As the detection section 55, a known position detection sensor, such as a detection sensor that uses an optical sensor or a lever-type sensor, can be used.

In this embodiment, the control section 13 that controls the operation of the printer 1 is structured so that when the control section 13 decides, according to detection information from the detection section 55, that the scanner unit 4 has shifted from the first position toward the second position, the control section 13 places the manipulation panel 6 (see FIG. 1) in an input inhibited state in which any input of a manipulation for the scanner unit 4 is not accepted. In this structure, when the scanner unit 4 is at other than the first position, the manipulation panel 6 can be placed in the input inhibited state. Therefore, it is possible to make the scanner unit 4 manipulable only when the scanner unit 4 is at the first position.

The control section 13 is structured so that when it decides, according to detection information from the detection section 55, that the scanner unit 4 has shifted from the first position to the second position and the amount of ink remaining in the liquid storage section 24 is at least at a level at which the liquid storage section 24 needs to be replenished with the ink, the control section 13 displays, on the manipulation panel 6, a message prompting the replenishment of the ink to the liquid storage section 24. A liquid remaining amount detector (not illustrated) is provided in the liquid storage section 24. According to detection information from the liquid remaining amount detector, the control section 13 can make a decision as to whether the amount of ink remaining in the liquid storage section 24 is at a level at which the liquid storage section 24 needs to be replenished with the ink.

In this structure, when the user has shifted the scanner unit 4 to the second position and only a small amount of ink remains in the liquid storage section 24 at that time, a message can be displayed on the manipulation panel 6 to prompt the user to replenish the ink to the liquid storage section 24.

Another structure is also possible in which when, with a medium P set in the upper supply opening 9 (see FIG. 3), the control section 13 decides, according to detection information from the detection section 55, that the scanner unit 4 has shifted from the first position toward the second position, the user is notified that there is a medium P in the upper supply opening 9 by, for example, a display on the manipulation panel 6, a sound, or a turned-on or blinking lamp.

To make a decision as to whether a medium P is set in the upper supply opening 9, a structure can be adopted in which a medium detection section that detects the presence or absence of a medium P in the upper supply opening 9 is provided and the control section 13 makes a decision according to detection information from the medium detection section. Another structure can also be adopted in which, for example, a cover detection section that detects the open/closed state of the supply opening cover 3 is provided and, when the control section 13 decides, according to detection result from the cover detection section, that the supply opening cover 3 is open, the user is notified.

Due to these structures, it is possible to avoid the risk that the scanner unit 4 is moved to the second position with a medium P set in the upper supply opening 9.

Variations

Figure 8:
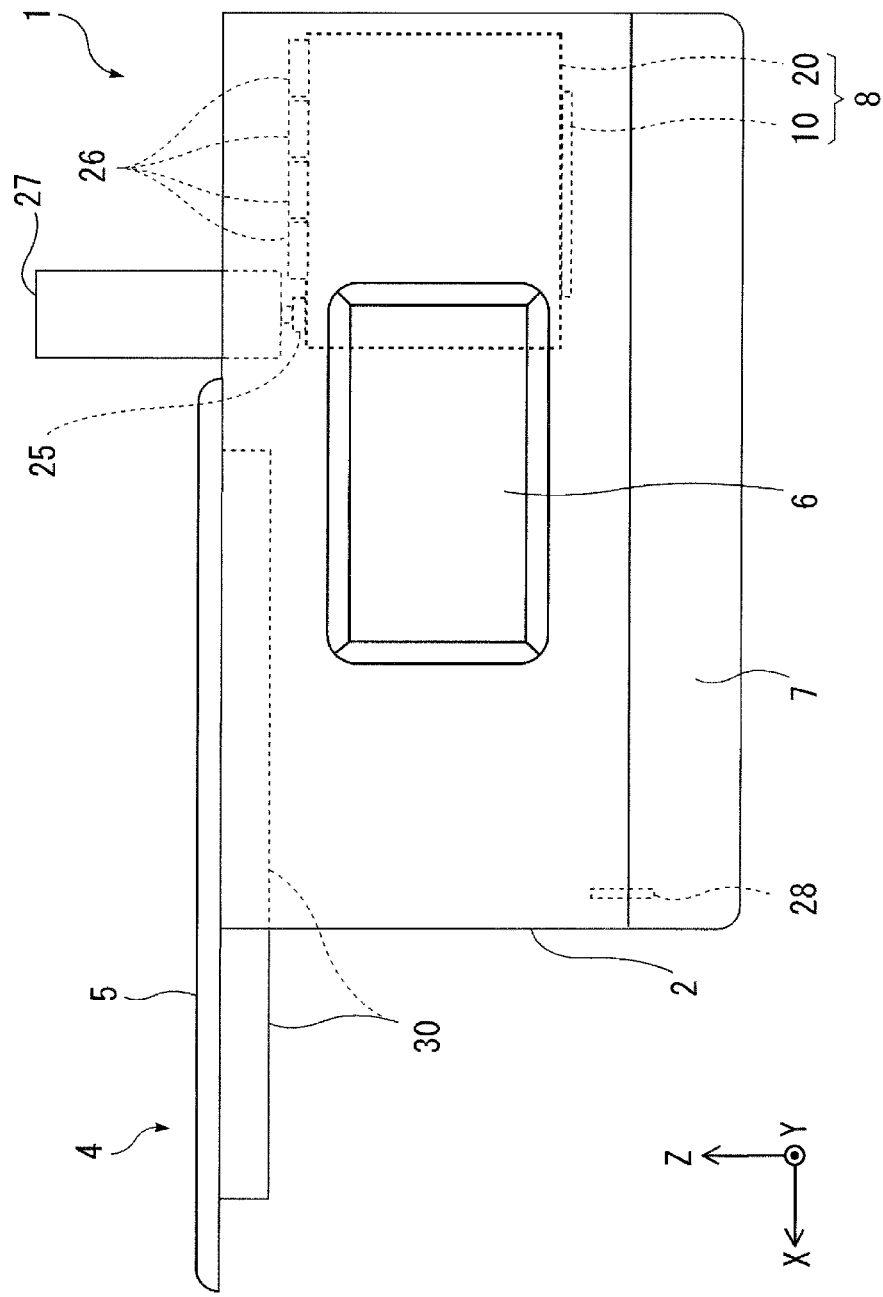
FIG. 8 illustrates a variation of the printer according to the first embodiment.

The scanner unit 4 can also be structured so that the scanner unit 4 can be horizontally moved in the width direction (X-axis direction) with respect to the recording unit 2 as illustrated in FIG. 8 to shift between the first position at which the recording unit 2 is used and the second position at which the recording unit 2 undergoes maintenance, the second position horizontally deviating from the first position as illustrated in FIG. 8.

Although not illustrated in FIG. 8, guide rails equivalent to the guide rails 41 in the first embodiment are provided inside the recording unit 2 so as to extend in the width direction as a shift mechanism that horizontally moves the scanner unit 4 in the width direction.

The scanner unit 4 is structured so that when the scanner unit 4 is shifted in the width direction, the scanner unit 4 does not interfere with the replenishment container 27 attached to the pour 25 at the second position illustrated in FIG. 8.

The second position of the scanner unit 4 can be set so that when the scanner unit 4 is horizontally moved in the width direction to have the scanner unit 4 shift from the first position to the second position as illustrated in FIG. 8, the top of a rotary encoder scale 28, for example, is covered, the rotary encoder scale 28 being provided on a motor that drives the transport roller pair 21, ejection roller pair 22, or another transporter. This structure makes it possible to reduce the risk that ink adheres to the rotary encoder scale 28 during the replenishment of ink to the liquid storage section 24.

In this embodiment, it is possible to adopt not only a structure in which the supply opening cover 3 positioned behind the scanner unit 4 is shifted together with the scanner unit 4 but also a structure in which only the scanner unit 4 is shifted without the supply opening cover 3 being moved.

Second Embodiment

A second embodiment will be described below with reference to FIGS. 9 and 10. In the second embodiment, constituent elements similar to constituent elements in the first embodiment will be denoted by like reference numerals in the first embodiment, and their descriptions will be omitted.

Figure 9:
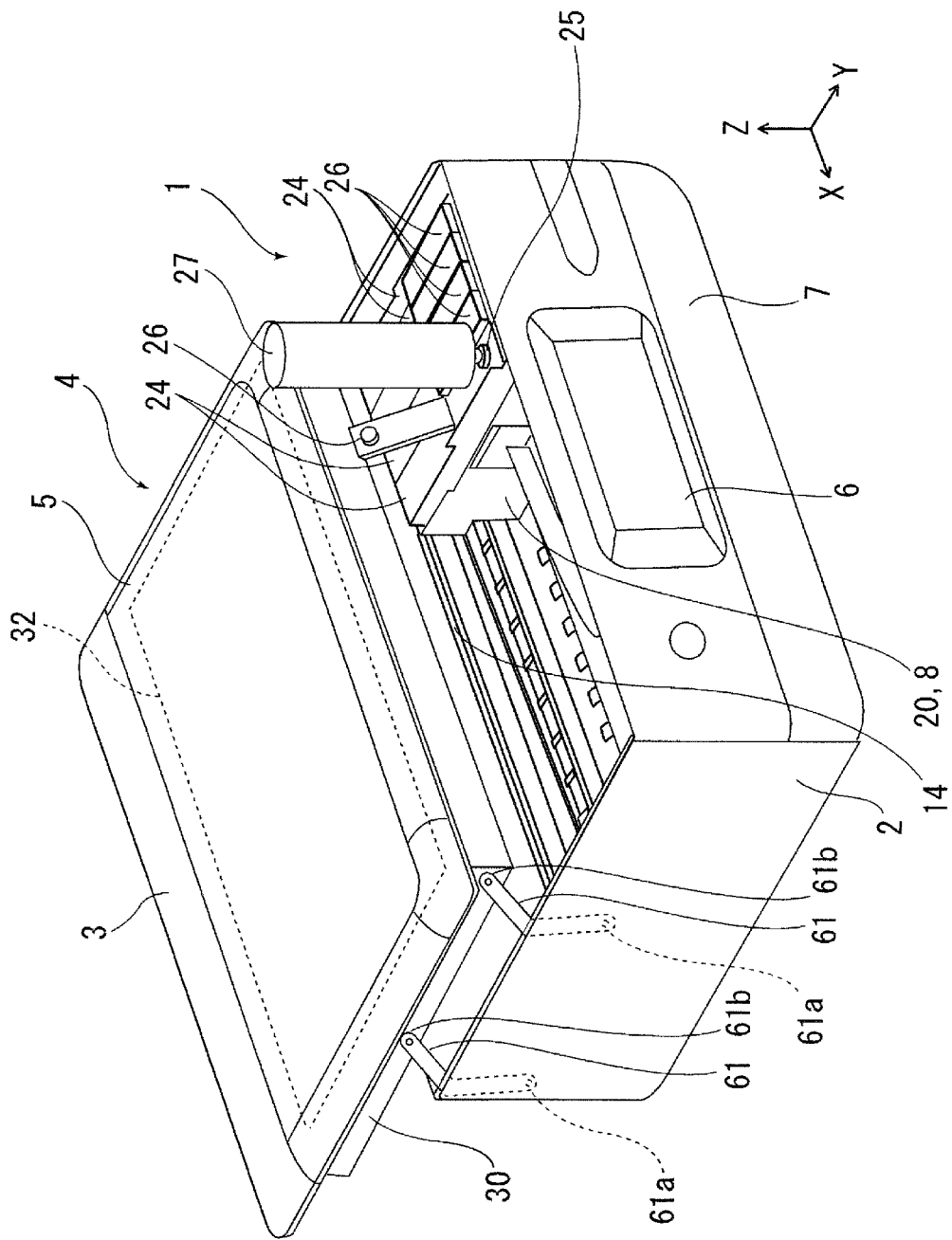
FIG. 9 is a perspective view illustrating a state in which a scanner unit has been moved to a second position in a printer according to a second embodiment.
Figure 10:
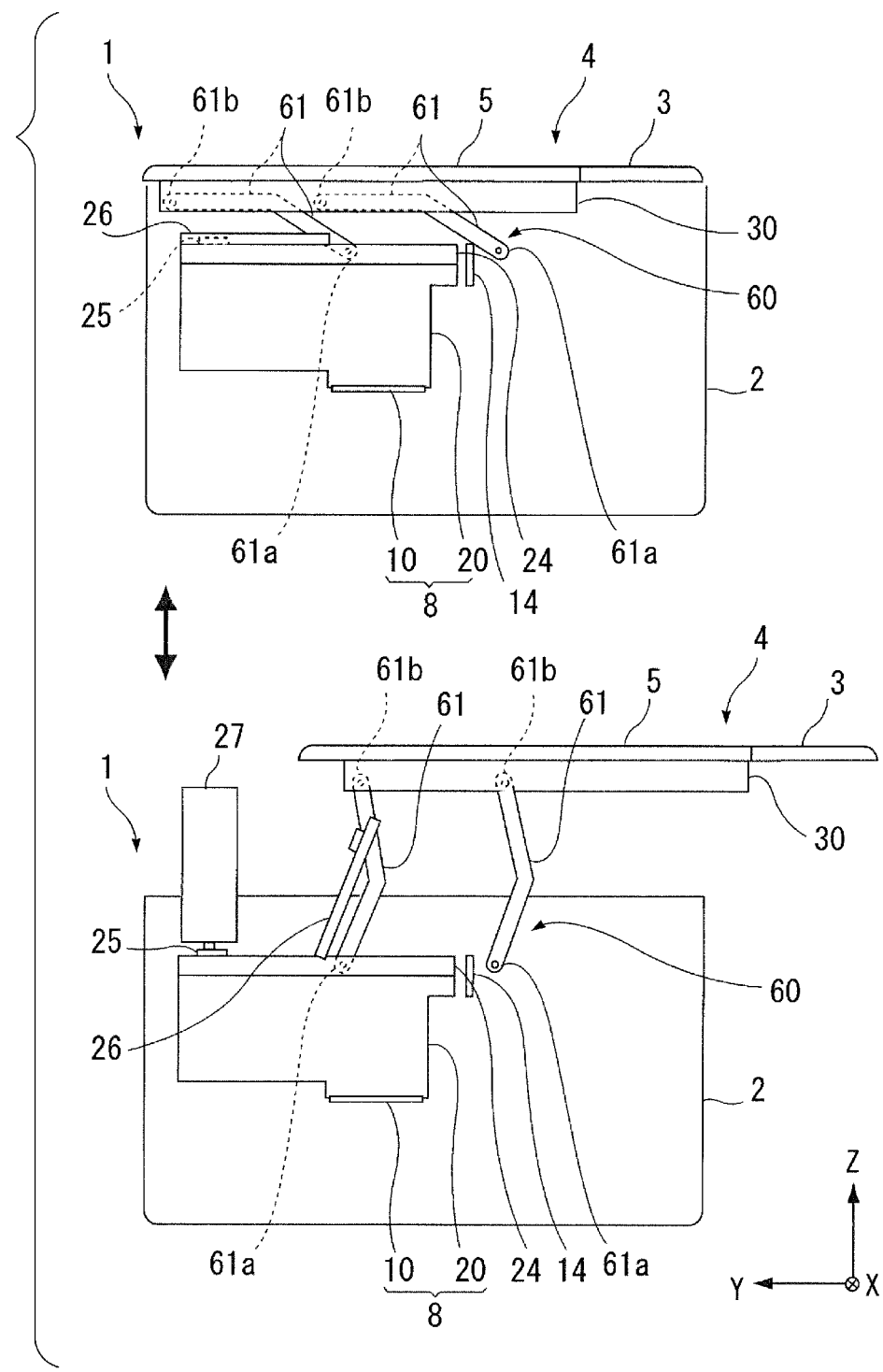
FIG. 10 illustrates a displacement mechanism of the scanner unit according to the second embodiment.

A shift mechanism 60 described in the second embodiment moves the scanner unit 4 in the depth direction and shifts it upward by singing arms 61 illustrated in FIGS. 9 and 10.

Each arm 61 has two ends, which are a first end 61a and a second end 61b. With the arm 61, the first end 61a, which is one of the two ends, is disposed so as to swingable with respect to the recording unit 2, and the second end 61b, which is the other of the two ends, is disposed so as to swing with respect to the scanner unit 4. In this embodiment, the arm 61 is disposed so that the first end 61a is swingably attached inside a side surface of the recording unit 2 and the second end 61b is swingably attached to the outside of a side surface of the housing 30. A total of four arms 61 are attached at both sides in the width direction, two at each end.

As illustrated in FIG. 10, when the plurality of arms 61 swing in parallel, the scanner unit 4 can be horizontally moved and be shifted upward, enabling the scanner unit 4 to be shifted from the first position illustrated in the upper drawing in FIG. 10 to the second position illustrated in the lower drawing in FIGS. 9 and 10 while the orientation of the original table 32 (see FIG. 9) is maintained.

In the second embodiment as well, it is possible to reduce the risk that the scanner unit 4 returns from the second position to the first position by its own weight.

In this embodiment as well, the scanner unit 4 is structured so as to cover the top of the linear scale 14 with the scanner unit 4 at the second position illustrated in the lower drawing in FIGS. 9 and 10. Therefore, it is possible to reduce the risk that ink adheres to the linear scale 14 during the replenishment of ink to the liquid storage section 24.

In the structure in the second embodiment, the scanner unit 4 horizontally moves in the depth direction and shifts upward. However, when arms 61 are attached to the front surface and rear surface of the printer 1, the scanner unit 4 can be horizontally moved in the width direction and is shifted upward by swinging the arms 61.

So far, embodiments of the present disclosure have been described, but the present disclosure is not limited to these embodiments. Various variations are possible without departing from the intended scope of the present disclosure described in the claims. It will be understood that these variations are also included in the range of the present disclosure.

What is claimed is:

1. A recording apparatus comprising:
a recording unit having a recorder that makes a record on a medium; and
a scanner unit having a reader that reads an original placed on an original table, the scanner unit being disposed on a top of the recording unit;
wherein the scanner unit is horizontally shifted between a first position at which the recording unit is used and a second position, which is a maintenance position of the recording unit, by maintaining its orientation in an up-down direction as it is shifted from the first position to the second position,
wherein the recorder makes a record by discharging a liquid to a medium,
wherein the recording unit has a liquid storage section that stores the liquid to be supplied to the recorder, the liquid storage section having a pour through which the liquid is supplied, and
wherein at the second position, the scanner unit does not interfere with a liquid replenishment container attached to the pour.

2. The recording apparatus according to claim 1, further comprising a guide rail extending horizontally, the scanner unit being shifted along the guide rail.

3. The recording apparatus according to claim 1, further comprising an arm having two ends, one of which is a first end swingably attached to the recording unit and another of which is a second end swingably attached to the scanner unit, wherein
when the arm is swung, the scanner unit is horizontally moved and is shifted upward.

4. The recording apparatus according to claim 1, further comprising a position holder configured to make a switchover between a shiftable state in which the scanner unit is shiftable between the first position and the second position and a hold state in which the scanner unit is held at least at the second position.

5. The recording apparatus according to claim 4, wherein the position holder has a resistor that produces a resistance during a switchover from the hold state to the shiftable state.

6. The recording apparatus according to claim 1, further comprising:
a detection section configured to detect a shift of the scanner unit from the first position to the second position;
a manipulation section that accepts a manipulation input; and
a control section that controls an operation of the recording apparatus according to a manipulation input made on the manipulation panel and to a detection result from the detection section; wherein
when the control section decides, according to detection information from the detection section, that the scanner unit shifted from the first position to the second position, the control section places the manipulation panel in an input inhibited state in which an input of a manipulation for the scanner unit is not accepted.

7. The recording apparatus according to claim 6, wherein:
the manipulation section has a display section on which information is displayed; and
when the control section decides, according to detection information from the detection section, that the scanner unit shifted from the first position to the second position and an amount of liquid remaining in the liquid storage section is at least at a level at which the liquid storage section needs to be replenished with the liquid, the control section displays, on the display section, a message prompting replenishment of the liquid to the liquid storage section.

8. The recording apparatus according to claim 1, wherein the recorder has a carriage that supports the recording unit that discharges the liquid, the liquid storage section being mountable in the carriage.

9. The recording apparatus according to claim 8, wherein:
the second position is closer to a back of the recording apparatus than is the first position;
the carriage moves in a width direction crossing a depth direction of the recording apparatus;
a linear scale extending in the width direction is provided, the linear scale being used to detect a position of the carriage; and
at the second position, the scanner unit covers a top of the linear scale.

* * * * *